United States Patent
Anderson

(10) Patent No.: US 11,999,542 B1
(45) Date of Patent: Jun. 4, 2024

(54) PRODUCT LIFTING DEVICE

(71) Applicant: Scott Anderson, Billings, MT (US)

(72) Inventor: Scott Anderson, Billings, MT (US)

(*) Notice: Subject to any disclaimer, the term of this patent is extended or adjusted under 35 U.S.C. 154(b) by 87 days.

(21) Appl. No.: 17/992,624

(22) Filed: Nov. 22, 2022

(51) Int. Cl.
*B65D 51/28* (2006.01)
*A47J 47/02* (2006.01)

(52) U.S. Cl.
CPC .............. *B65D 51/28* (2013.01); *A47J 47/02* (2013.01)

(58) Field of Classification Search
CPC ................................ B65D 51/28; A47J 47/02
USPC ........................................................ 220/212
See application file for complete search history.

(56) References Cited

U.S. PATENT DOCUMENTS

| | | | |
|---|---|---|---|
| 2,112,551 A * | 3/1938 | Anderson | B65D 83/005 206/761 |
| 2,849,154 A * | 8/1958 | Gartrell | B65D 85/1009 206/254 |
| 6,257,459 B1 | 7/2001 | Michelson et al. | |
| 6,269,974 B1 | 8/2001 | Michelson et al. | |
| 6,299,030 B1 | 10/2001 | Michelson et al. | |
| 6,318,602 B1 | 11/2001 | Michelson et al. | |
| 6,561,388 B2 | 5/2003 | Michelson et al. | |
| 7,070,070 B2 | 7/2006 | Michelson et al. | |
| 7,387,204 B2 | 6/2008 | Lee | |
| 7,487,878 B2 | 2/2009 | Giwargis et al. | |
| 7,556,167 B2 | 7/2009 | Giwargis et al. | |
| 7,775,407 B2 | 8/2010 | Dyer | |
| 8,523,013 B2 | 9/2013 | Sines | |
| 9,896,260 B2 | 2/2018 | Sines | |
| 10,167,132 B2 | 1/2019 | Sines | |
| 10,787,305 B1 | 9/2020 | Ivanenko et al. | |
| 2002/0070243 A1 | 6/2002 | Michelson et al. | |
| 2005/0056566 A1 | 3/2005 | Lee | |
| 2005/0072784 A1 | 4/2005 | Michelson et al. | |
| 2007/0056968 A1 | 3/2007 | Giwargis et al. | |
| 2008/0149661 A1 | 6/2008 | Sines | |
| 2009/0188936 A1 | 7/2009 | Marando | |
| 2009/0230154 A1 | 9/2009 | Dyer | |
| 2013/0313258 A1 | 11/2013 | Sines | |
| 2015/0353265 A1 | 12/2015 | Jethwani | |
| 2017/0065130 A1 | 3/2017 | Berry | |
| 2018/0237210 A1 | 8/2018 | Sines | |

FOREIGN PATENT DOCUMENTS

| | | | | |
|---|---|---|---|---|
| CN | 206821915 U | * | 1/2018 | ............. A23L 19/20 |
| JP | H06958 Y2 | * | 1/1994 | ............... A23B 4/03 |
| KR | 20180014448 A | * | 2/2018 | ............. A47J 31/005 |

* cited by examiner

*Primary Examiner* — Nathan J Jenness
*Assistant Examiner* — Eric C Baldrighi
(74) *Attorney, Agent, or Firm* — Antoinette M. Tease

(57) ABSTRACT

A product lifting device including a lifting platform, a cap assembly, and a plurality of lifting lines configured to connect the lifting platform to the cap assembly. The lifting platform is configured to fit within a container having a cap and an opening. The cap assembly has both a lifting ring and an adapter. The lifting ring is configured to fit over a bottom part of the adapter, which is configured to fit over the opening in the container. The top part of the adapter is configured to receive the container cap. The lifting lines extend upwardly from the lifting platform, through the bottom part of the adapter from inside to outside, and terminate at the lifting ring.

6 Claims, 4 Drawing Sheets

PRODUCT LIFTING DEVICE

BACKGROUND OF THE INVENTION

1. Field of the Invention

Figure 1:
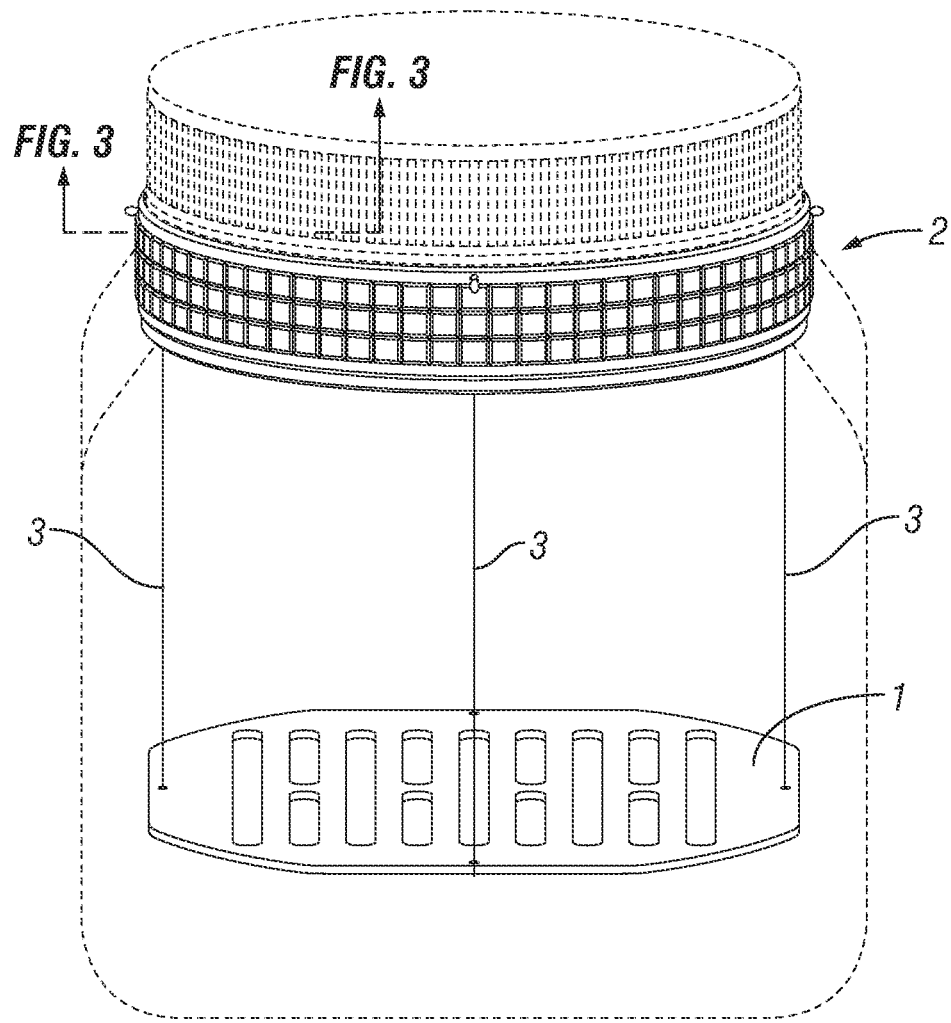

The present invention relates generally to the field of containers for food products or other items and, more particularly, to a lifting device that is integral to the cap of the container.

2. Description of the Related Art

A number of inventions have been directed toward solving the problem of how to lift product from the bottom of a container. Some examples are discussed below. None of these previous inventions, however, incorporates the structural and functional advantages of the present invention, which are discussed more fully below.

Gary K. Michelson bas patented a number of related inventions from 2001 to 2006. These patents are all variations on a similar theme. All of these patents cover a content lifting and removing container assembly comprised of a support plate that is connected to the top of the container by a connector. The connector is attached to both the support plate and the top of the container so that when the top is lifted, the contents are lifted by the support plate at the same time. In various embodiments, the top, connector and support plate are configured to allow angulation of a removable portion of the top sufficient to allow the removable portion of the top to be separated from the container. In another embodiment, the top is replaceable and comprises a circular member with a flange that is adapted to engage the upper surface of the sidewall of a can and means for mechanically articulating with an end of the connector of the lifting assembly opposite the support plate. In another embodiment, the container comprises an unfurling portion that is attached to the connector and to the interior surface of the top and configured to unfurl as the top is separated from the container. In yet another embodiment, at least one end of the connector forms a mechanically interlocking articulation with either the top or the support plate. In a preferred embodiment, the connector, top and support plate are adhesively bonded to one another.

U.S. Pat. No. 7,387,204 (Lee, 2008) presents a pull-up tray container for cosmetic brushes. A tray is provided within a container, and a rod extends between the tray and the lid. The lid is configured so that when the lid is lifted, the tray moves upwardly, thereby lifting the contents of the container at the same time.

U.S. Pat. No. 7,487,878 (Giwargis el al., 2009) describes an apparatus for elevating objects stored in a container. The apparatus comprises a lift with a base, at least one guide with a first end that is coupled to the base, and an outer ring. The second end of the guide is coupled to the outer ring and configured so that it may be adjusted vertically along the sidewall of the container, thereby causing the based to move within the interior of the container at the same time.

U.S. Pat. No. 7,775,407 (Dyer, 2010) discloses a contents extractor for jars that is inserted into a food jar or household container. The extractor is comprised of a handle with an actuator that is squeezed by the operator, an elongated mechanized shaft that transfers movement from the actuator, and a flexible material that retracts and transforms into a disc shape to the inner surface of the container. To operate this device, the operator pulls the entire device upward out of the container, thereby removing the contents of the jar as they are lifted by the disc-shaped flexible material. The disc-shaped flexible material is retracted and extended via pivot arms that extend from the bottom of the shaft to the top of the disc-shaped flexible material and cause is to retract and extend in the manner of butterfly wings. The pivot arms are operably connected to the actuator.

U.S. Pat. No. 8,523,013 (Sines, 2013) provides a container for articles in a liquid bath with an elevating lift disposed therein. The lift is configured so that it can be moved toward an upper position, thereby raising at least a portion of the contents of the container out of the liquid bath. This upward movement is effectuated via helical slots in the "operator," which is a cylindrical part situated inside of a cylindrical canister. The operator comprises a sleeve that is disposed adjacent to an inner wall of the canister. An interior reticulated lift in the form of a circular platform is also situated inside of the canister and comprises a follower, which engages with the helical slots in the operator, thereby causing the interior lift to move upwardly when the operator is moved.

U.S. Pat. No. 9,896,260 (Sines, 2018) is a continuation-in-part of the '013 patent discussed above, and U.S. patent Ser. No. 10/167,132 (Sines, 2019) is a continuation of the '260 patent. Both of these filings present a mechanism that is similar to that addressed in the $013 patent, namely: a canister with an interior cavity, an interior sidewall, and either a helical or longitudinal groove on the inside of the sidewall; a lift that is configured to hold contents of the canister and that has projections extending therefrom; and an operator that is situated inside of the canister and that comprises either a helical slot (if the canister has a longitudinal groove) or a longitudinal slot (if the canister has a helical groove), The operator is configured so that rotation of the operator relative to the canister causes the lift projections to travel along the canister engagement features, thereby moving the lift vertically within the main body of the operator. In an alternate embodiment, the engagement feature on the interior sidewall of the canister is a diagonal groove.

U.S. Patent Application Pub. No. 2009/0188936 (Marando) shows a mechanism for raising chips in a canister. The mechanism includes a rigid tubular case, a sling inside of the case, a handle outside of the case, and cables that connect the sling to the handle. The cables are configured so that when the handle is moved downward, the cables hoist the sling upwardly within the container. Conversely, when the handle is moved upward, the sling is lowered within the container.

U.S. Patent Application Pub. No. 2015/0353265 (Jethwani) describes a beverage or foodstuff dispenser comprising a cylindrical body part with a dispensing channel at one end and an opening for receiving a dispensing member at the other end. Each of the cylindrical body part and the dispensing member has one or more protuberances and corresponding guide channels that are configured to cause the movement of the dispensing member along and within the cylindrical body toward the dispensing channel. The dispensing member may be rotated in either direction within the cylindrical body. The contents of the container are pushed toward the dispensing channel as the dispensing member rises within the cylindrical body.

BRIEF SUMMARY OF THE INVENTION

The present invention is a product lifting device comprising: a lifting platform; a cap assembly; and a plurality of lifting lines configured to connect the lifting platform to the cap assembly: wherein the lifting platform is configured to fit within a container; wherein the cap assembly is comprised of a lifting ring and an adapter; wherein the lifting ring is configured to fit over a bottom part of the adapter; wherein a top part of the adapter is configured to receive a cap of the container; and wherein the bottom part of the adapter is configured to fit over an opening in the container. In a preferred embodiment, the lifting ring comprises: an outer gripping surface: and a plurality of protrusions that are disposed around an inner circumferential surface of the lifting ring and that are configured to engage with a plurality of teeth disposed around an outer circumferential surface of the bottom part of the adapter. Each of the plurality of lifting lines is preferably configured to extend upwardly from the lifting platform, to pass through the bottom part of the adapter from an inside of the bottom part of the adapter to an outside of the bottom part of the adapter, and to terminate at an inside of the lifting ring.

In a preferred embodiment, the bottom part of the adapter comprises a lip that extends around a bottom periphery of the adapter and is configured to secure the lifting ring in place on the bottom part of the adapter. Preferably, the top part of the adapter has an outer diameter, the bottom part of the adapter has an outer diameter, and the outer diameter of the bottom part of the adapter is greater than the outer diameter of the top part of the adapter. In yet another preferred embodiment, the lifting ring comprises a top part and a bottom part; wherein the bottom part of the lifting ring comprises a band that extends circumferentially around an interior of the bottom part of the lifting ring; wherein the band has an inner diameter; wherein the top part of the lifting ring has an inner diameter; and wherein the inner diameter of the band is less than the inner diameter of the top part of the lifting ring.

BRIEF DESCRIPTION OF THE DRA WINGS

Figure 2:
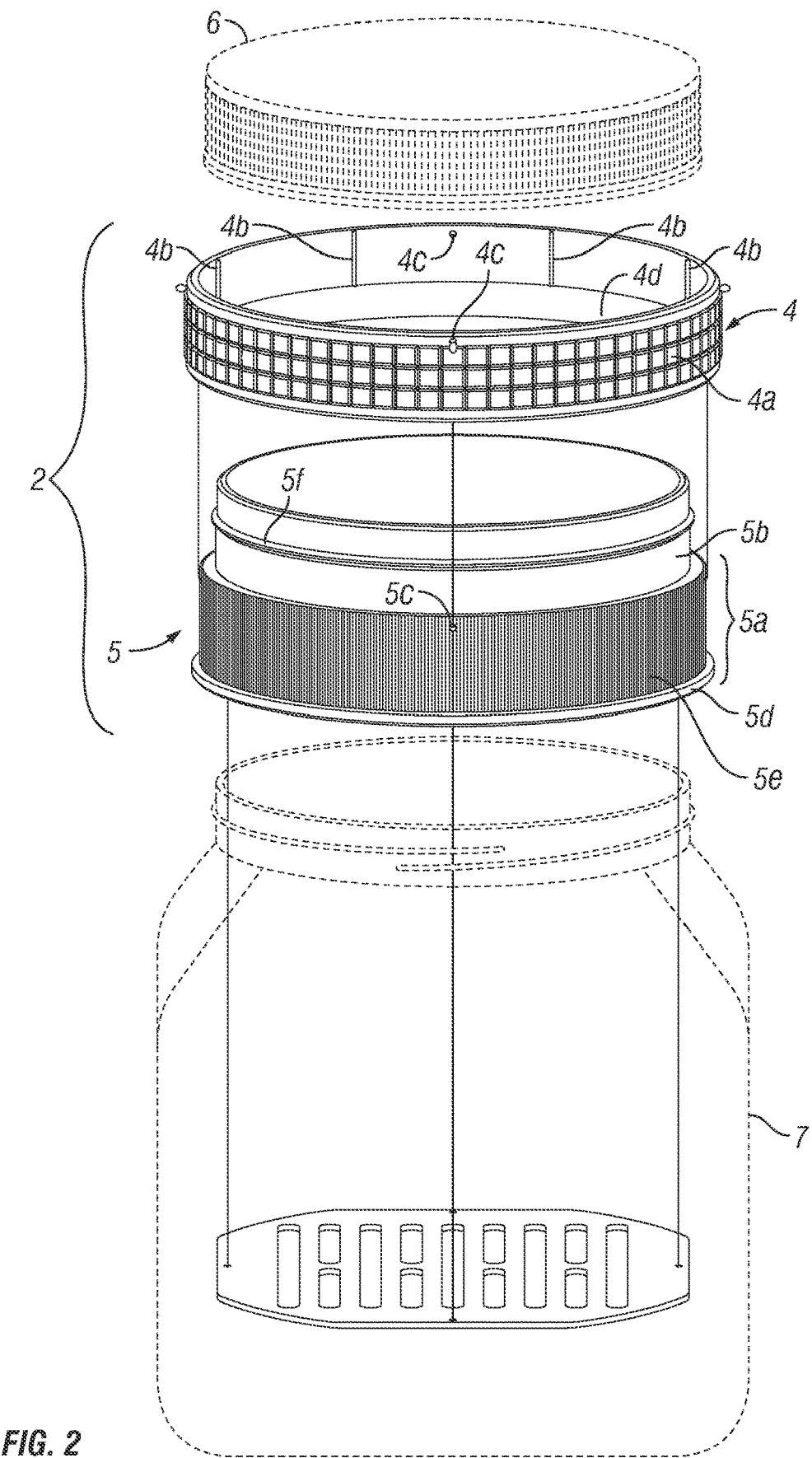
Figure 3:
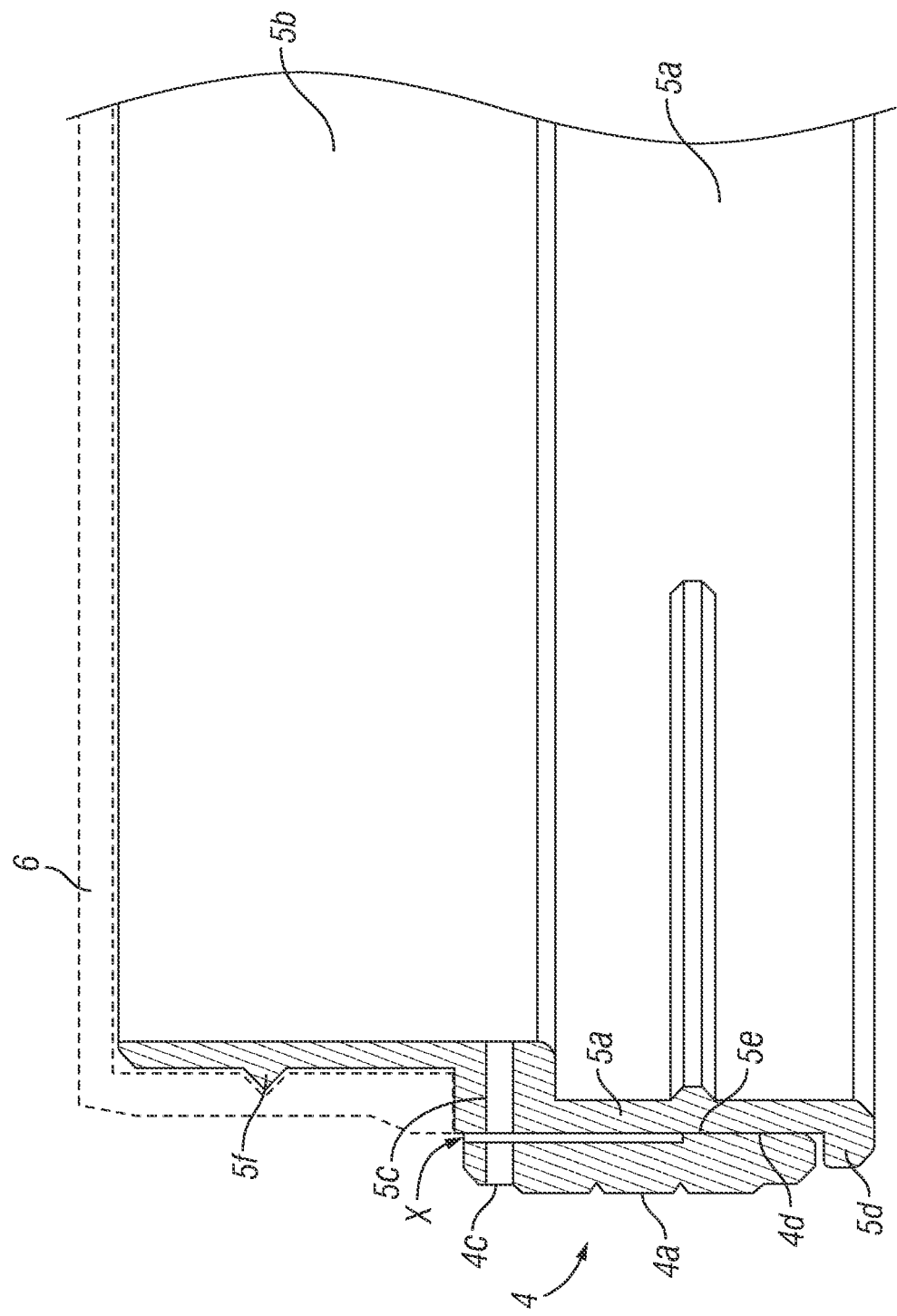
Figure 4:
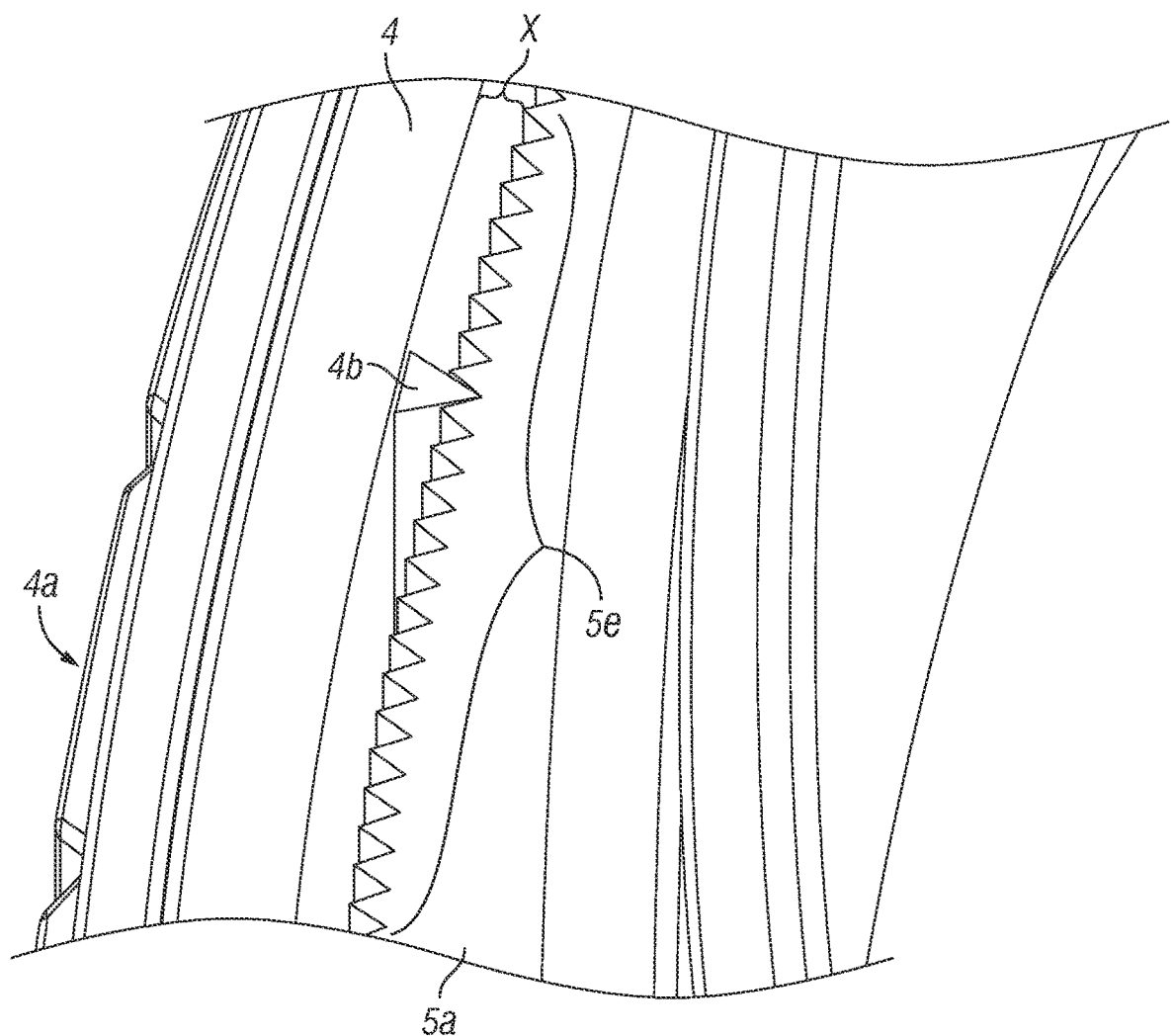

FIG. 1 is a front perspective view of the present invention.
FIG. 2 is an exploded view of the present invention.
FIG. 3 is a section view of the cap assembly of the present invention.
FIG. 4 is a detail view of the interior ratchet mechanism of the cap assembly of the present invention.

REFERENCE NUMBERS

1 Lifting platform
2 Cap assembly
3 Cables
4 Lifting ring
4a Gripping surface
4b Protrusion
4c Holes (in lifting ring)
4d Circumferential band
5 Adapter
5a Bottom part (of adapter)
5b Top part (of adapter)
5c Holes (in adapter)
5d Circumferential lip (on bottom part of adapter)
5e Teeth (on bottom part of adapter)
5f Circumferential lip (on top part of adapter)
6 Existing cap (not part of present invention)
7 Container (not part of present invention)

DETAILED DESCRIPTION OF INVENTION

FIG. 1 is a front perspective view of the present invention. As shown in this figure the invention comprises a lifting platform 1, a cap assembly 2, and a plurality of cables 3 (or "lifting lines") connecting the lifting platform 1 to the cap assembly 2. The lifting platform 1 is configured to fit within a container 7. Note that the container 7 is shown in dotted lines to indicate that the present invention is not limited to any particular shape or configuration of the container 7, as long as the lifting platform 1 is configured to fit within the container and to cover all or most of the bottom surface of the container.

FIG. 2 is an exploded view of the present invention. As shown in this figure, the cap assembly 2 is comprised of a lifting ring 4 and an adapter 5. When the device is assembled, the lifting ring 4 fits over the bottom part 5a of the adapter 5. Note that the inside of the bottom part 5a of the adapter 5 is preferably threaded so that the bottom part of the adapter can be screwed onto the open top of an existing container 7 (see also FIG. 4). The top part 5b of the adapter 5 is configured to receive the existing cap 6: in this particular embodiment, the top part 5b of the adapter 5 comprises a circumferential lip St that enables the existing cap 6 to snap onto the top part 5b of the adapter 5. The circumferential lip Sf on the top part 5b of the adapter 5 is not necessarily required as long as the top part of the adapter is configured to receive the cap 6 (for example, the top part of the adapter may be threaded). Similarly, the bottom part 5a of the adapter 5 may be configured to snap onto (rather than thread onto) an existing container top.

The lifting ring 4 is comprised of an outer gripping surface 4a to facilitate rotation of the lifting ring by the operator. The lifting ring 4 is also comprised of a plurality of protrusions 4b that are preferably evenly spaced around the inner circumferential surface of the lifting ring 4. The protrusions 4b extend from top edge of the lifting ring 4 downward and terminate before reaching the bottom edge of the lifting ring. In a preferred embodiment, there is a band 4d that extends circumferentially around the interior of the bottom part of the lifting ring 4. The protrusions 4b terminate at the top edge of this band 4d. The band 4d has a slightly smaller inner diameter than the top part of the lifting ring (in between the protrusions 4b), which allows the lifting ring 4 to grip more tightly onto the bottom part 4a of the adapter 5 (see also FIG. 3). Each protrusion 4b is preferably in the shape of a "V" with the point of the "V" extending away from the inside surface of the lifting ring 4, as shown in FIG. 4. The present invention is not necessarily limited to a V-shaped protrusion, however; the protrusions 4b may take some other form as long as they serve to "ratchet" the lifting ring 4 against the bottom part 5a of the adapter 5.

As noted above, the adapter 5 is comprised of a bottom part 5a and a top part 5b. One end of each cable 3 is attached to the lifting platform 1, and the other end is attached to the top edge of the lifting ring 4. In the embodiment shown here, each cable 3 extends through a hole Sc at the top edge of the bottom part 5a of the adapter 5 (from the inside out) and then through another hole 4c at the top edge of the lifting ring 4 (again, from the inside out). In this manner, the cables 3 extend upwardly from the lifting platform 1 inside of the container, proximate to the periphery of the container (not in the center of the container 7 but rather on the outside edges of the lifting platform 1), up to approximately the center of the adapter 4 (that is, to the top edge of the bottom part 5a), and then pass through both the bottom part 5a of the adapter 5 and the top edge of the lifting ring 4. The present invention is not limited to any particular manner of affixing the cables 3 to the lifting ring 4; for example, rather than passing through a hole 4c in the lifting ring 4 and being secured with a knot on the outside of the lifting ring, as shown, the cables 3 may be attached to the lifting ring 4 with adhesive or other bonding agent. Similarly, the present invention is not limited to any particular manner of attaching the cables 3 to the lifting platform 1. Note that the holes 4c, 5c on the lifting ring and adapter 5 are configured so that they are horizontally aligned when the cap assembly 2 is installed on the container 7.

FIG. 3 is a section view of the cap assembly of the present invention taken at the line shown in FIG. 1. The cable 3 has been omitted from this figure for clarity. In this figure, the lifting ring 4 has been placed over the bottom part 5a of the adapter 5. As shown in this figure, the bottom part 5a of the adapter comprises a lip 5d that extends around the bottom periphery of the adapter 5. This lip 5d helps secure the lifting ring 4 in place on the bottom part 5a of the adapter 5 (see also FIG. 2). Note that the outer diameter of the bottom part 5a of the adapter is greater than the outer diameter of the top part 5b of the adapter (see also FIG. 2). This is to allow the existing cap 6 to sit on top of the bottom part 5a of the adapter 5, as shown also in FIG. 1. This section view has been taken through one of the teeth 5e on the bottom part 5a of the adapter 5; as such, it shows the gap ("X") that is described below in connection with FIG. 4.

FIG. 4 is a detail view of the interior ratchet mechanism of the cap assembly of the present invention. As shown in this figure (and also in FIG. 2), the outside circumferential surface of the bottom part 5a of the adapter 5 is comprised of teeth 5e that are configured to receive the tips of the V-shaped protrusions 4b on the lifting ring 4, as shown. Note that there is a small gap (marked as "X" in FIG. 4) between the outside surface of the bottom part 5a of the adapter 5 and the inside surface of the lifting ring 4 to accommodate the protrusions 4b. The actual depth (front to back) of each protrusion 4b is slightly greater than this gap "X" in order to enable the protrusions 4b to interact with the teeth 5e to provide a ratcheting mechanism. This ratcheting mechanism allows the lifting ring to be rotated in either direction and secured in place until manually rotated again.

As the lifting ring 4 is rotated, the cables 3 are pulled in the same direction as the lifting ring 4, thereby raising or lowering the lifting platform 1. Note that the cables 3 pass outside of the top part 5b of the adapter 5 and inside of the lifting ring 4. All parts of the present invention may be made of any suitable material. It is important to note that the present invention is designed so as to maintain a seal between the cap assembly 2 and the container 7, thereby maintaining freshness of the container contents. The present invention is also designed to accept the existing cap of the container.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A product lifting device comprising:
   (a) a lifting platform;
   (b) a cap assembly; and
   (c) a plurality of lifting lines configured to connect the lifting platform to the cap assembly;
   wherein the lifting platform is configured to fit within a container;
   wherein the cap assembly is comprised of a lifting ring and an adapter;
   wherein the lifting ring is configured to fit over a bottom part of the adapter;
   wherein a top part of the adapter is configured to receive a cap of the container; and
   wherein the bottom part of the adapter is configured to fit over an opening in the container.

2. The product lifting device of claim 1, wherein the lifting ring comprises:
   an outer gripping surface; and
   a plurality of protrusions that are disposed around an inner circumferential surface of the lifting ring and that are configured to engage with a plurality of teeth disposed around an outer circumferential surface of the bottom part of the adapter.

3. The product lifting device of claim 1, wherein each of the plurality of lifting lines is configured to extend upwardly from the lifting platform, to pass through the bottom part of the adapter from an inside of the bottom part of the adapter to an outside of the bottom part of the adapter, and to terminate at an inside of the lifting ring.

4. The product lifting device of claim 1, wherein the bottom part of the adapter comprises a lip that extends around a bottom periphery of the adapter and is configured to secure the lifting ring in place on the bottom part of the adapter.

5. The product lifting device of claim 1, wherein the top part of the adapter has an outer diameter, the bottom part of the adapter has an outer diameter, and the outer diameter of the bottom part of the adapter is greater than the outer diameter of the top part of the adapter.

6. The product lifting device of claim 1, wherein the lifting ring comprises a top part and a bottom part;
   wherein the bottom part of the lifting ring comprises a band that extends circumferentially around an interior of the bottom part of the lifting ring;
   wherein the band has an inner diameter;
   wherein the top part of the lifting ring has an inner diameter; and
   wherein the inner diameter of the band is less than the inner diameter of the top part of the lifting ring.

* * * * *